& # # United States Patent [19]

Drews

[11] Patent Number: 5,988,568
[45] Date of Patent: Nov. 23, 1999

[54] SURFACE MODIFICATION APPARATUS AND METHOD FOR DECREASING THE DRAG OR RETARDING FORCES CREATED BY FLUIDS FLOWING ACROSS A MOVING SURFACE

[76] Inventor: Hilbert F. P. Drews, 5640 S. 76th St., Greendale, Wis. 53129

[21] Appl. No.: 08/935,182

[22] Filed: Sep. 22, 1997

[51] Int. Cl.[6] ............................................. B64C 21/10
[52] U.S. Cl. ..................... 244/200; 244/130; 244/199; 296/180.1
[58] Field of Search ...................... 244/200, 130, 244/199; 428/167, 156; 416/236 R; 296/180.1

[56] References Cited

U.S. PATENT DOCUMENTS

| | | |
|---|---|---|
| 2,272,358 | 2/1942 | Steinhaus . |
| 2,346,552 | 4/1944 | Brotz . |
| 3,578,264 | 5/1971 | Kuethe . |
| 3,776,363 | 12/1973 | Kuethe . |
| 4,284,302 | 8/1981 | Drews .......................................... 296/1 |
| 4,354,648 | 10/1982 | Schenk et al. . |
| 4,619,423 | 10/1986 | Holmes et al. . |
| 4,907,765 | 3/1990 | Hirschel et al. . |
| 4,932,612 | 6/1990 | Blackwelder et al. . |
| 4,986,496 | 1/1991 | Marentic et al. ........................ 244/130 |
| 5,069,403 | 12/1991 | Marentic et al. . |
| 5,114,099 | 5/1992 | Gao . |
| 5,133,516 | 7/1992 | Marentic et al. ........................ 244/130 |

FOREIGN PATENT DOCUMENTS

| | | | |
|---|---|---|---|
| 2282548 | 8/1974 | France ..................................... 416/236 |
| 1665882 | 7/1991 | Russian Federation ............... 244/130 |

*Primary Examiner*—Peter M. Poon
*Assistant Examiner*—Tien Dinh
*Attorney, Agent, or Firm*—Andrus, Sceales, Starke & Sawall

[57] ABSTRACT

A body moving through a fluid has air control and directing elements on its outer surface. The elements are laterally and longitudinally spaced and includes elements having a forward curved nose or front portion and tapered tail portions projecting outwardly from the main body. Each of the elements and body space between the elements is covered with parallel ribs extending parallel to the elements. Special elements may include raised flexible tail portions for further interacting with the air or other fluid. The shape of the elements and the ribs are varied in accordance with the desired interaction with the fluid to create the multidimensional fluid movement over the surface. Various different shapes and configurations of the elements are described.

9 Claims, 3 Drawing Sheets ns extending in the direction of movement to define
surface control tending to promote the air movement into the
angularly related elements such as shown in the inventor's
previously identified patent.

SURFACE MODIFICATION APPARATUS AND METHOD FOR DECREASING THE DRAG OR RETARDING FORCES CREATED BY FLUIDS FLOWING ACROSS A MOVING SURFACE

BACKGROUND OF THE INVENTION

The present invention relates to providing a surface of a body with flow modifying elements for creating improved movement through a fluid.

A number of patents disclose utilization of various devices to redirect the air over surfaces for reducing of the drag created on a surface such as the surface on an automobile as it moves through the air, the surface of a boat or like structure moving through water, fans and other rotating elements rotating within air, water or other fluids. For example, U.S. Pat. No. 4,986,496, which issued Jan. 22, 1991, discloses a serrated or riblet type surface in which the various troughs are generated extended in a particular common direction. U.S. Pat. No. 5,069,403, issued Dec. 3, 1995 to the present inventor, discloses an improved surface modification elements generally extending also in the direction of the vehicle travel to provide a reduced drag in an assisting propulsion effect.

These and other prior art referenced, for example, in the above two patents are available with respect to understanding the prior art.

There is a continuing demand, however, for various improvements for practical application for further effectively modifying the surface characteristic to promote the more efficient movement of articles and devices through fluid mediums.

SUMMARY OF THE PRESENT INVENTION

The present invention is particularly directed to a surface treatment of body which creates a synergistic surface and provides effective directional movement of the fluid in a plurality of directions to produce a graduated and interactive air mass overlying the surface to reduce the drag and effectively promote the forward and relative smooth movement between the body and the fluid. The surface treatment can be directly formed or formed as a separate member or segment such as a highly flexible sheet which can then be secured to the generally outer surface of a body. When separately formed, it preferably closely conforms to the outer surface to which it is applied with the control elements substantially effecting each of the surface areas in accordance with the teaching herein. The interconnection, of course, will, either as formed directly or separately applied, produce a preselected surface treatment to create effective relative movement of the fluid and the body during the useful life of the body.

Generally, in accordance with the teaching of the present invention, air control and directing elements of a curved configuration are secured to the body in parallel relationship to each other and at selected angular relationship to the direction of relative movement of the body and the fluid. The surface elements serve to capture the air and redirect it at different angles to the direction of movement and synergistically promote a smooth movement of the air through a generally reduced and then enlarged passageway with air built up on the surface to provide a drive reaction on the surface. The elements are preferably interconnected by continuous surfaces conforming to the underlying outer surfaces of the body. In a preferred embodiment, the elements may include a riblet surface of small members ele- Generally, in accordance with the teaching of the present invention, the control element of the present invention will have a forward generally conical surface having a forward end for engaging of the air and then forming a lateral passageway which develops a generally tapered surface to increase the velocity of the air and then emit the air to function as a jet of air to reduce the drag effect as well as to develop an energy from the reverse or lateral flow to promote the forward movement of the object. When applied to a surface for directing the air upwardly such as shown in the inventor's prior patent, the volume of air will be increased within the additional elements to further promote the total overall effect with a maximum reduction in drag and forward movement of the body.

Further, depending upon the particular application, the elements provided in accordance with the teaching herein, may be formed of different heights and lateral dimensions while maintaining smooth surfaces throughout to maintain a very effective characteristic. In particular, applicant suggests the use of a generally continuously tapering semi-conical element having a taper from the forward end expanding outwardly to a generally central portion and then tapering rearwardly to a final conical discharge end Thus, as used herein, a semi-conical surface defines a generally round or one/half of a round smooth-shaped member expanding generally from the forward end in a cone-configuration to a central portion and then moving through a smooth rearward conical portion as an extension from said central portion.

The elements may be formed in angularly oriented in an angular orientation from substantially 0° to 90° depending upon the particular surface to which it is applied. Thus, with respect to a vertical flat back wall of a trailer or the like, the elements may advantageously be placed at 90° to nullify to an extent the suction created by the unit moving through the air and directing and promoting lateral movement of the air adjacent to the back wall to thereby increase the forward effective movement. An angularly directed element with the angular orientation may be somewhat related to maintain the angular orientation with respect to the water engagement with the forward face of the blade.

Thus, these and other applications will readily occur and be understood by those skilled in the art. Thus, the concept is to provide a surface modification which is angularly related to the primary air flow with respect to the body. The system will not only reduce the drag effect but may actually subtract energy from the reverse type of flow as a result of the guiding movement of the air. The system will promote the minimum horizontal drag reducing effect on vertical surfaces and may further contribute the structural strength of the surface.

In a further contemplated embodiment, the elements may be made of a somewhat flexible material and secured primarily at the forward base portion to allow the action of absorption and then release of energy as a result of surges and eddy flow of the air or other fluid medium extending along the length of the surface. The flexing action will tend to smooth the operation by minimizing any adverse courses as a result of the alternate absorbing and releasing of the energy.

In summary, the elements used are designed to maximize the effective forward energy of the body with the surface of the elements curved and rounded and otherwise shaped to promote the flow of the fluid medium into an effective forward propulsion chamber in such a manner as to promote the forward thrust of the vehicle.

Various embodiments will be readily understood from the preferred embodiments described herein.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figure 3:
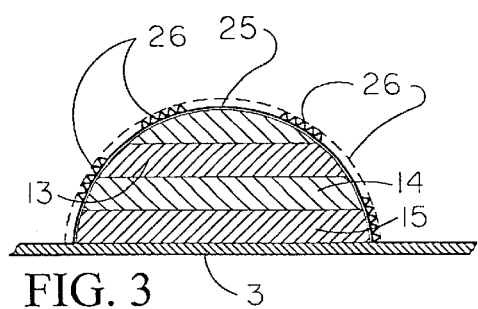
FIG. 3 is a lateral section taken generally on line 3—3 of FIG. 2.
Figure 1:
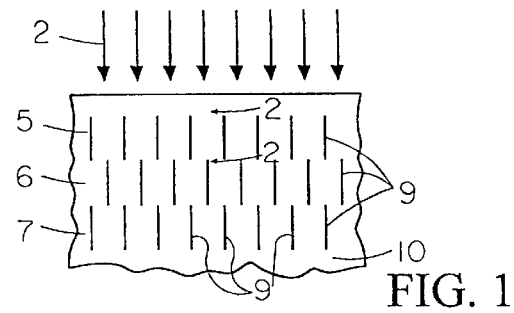
FIG. 1 is a plan view of a unit incorporating air drag treatment elements, which are diagrammatically shown in FIG.
Figure 1A:
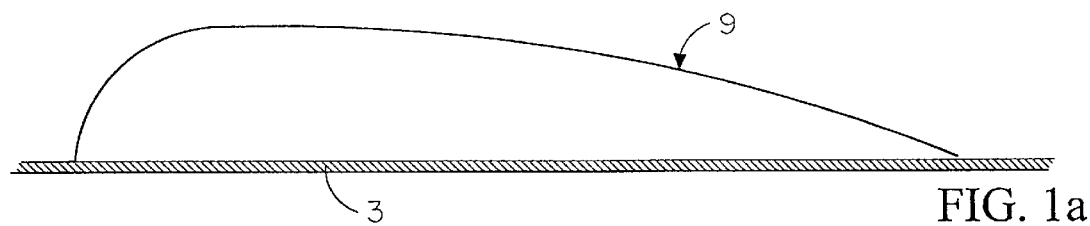
FIG. 1a is a side view of an element shown in FIG. 1.
Figure 2:
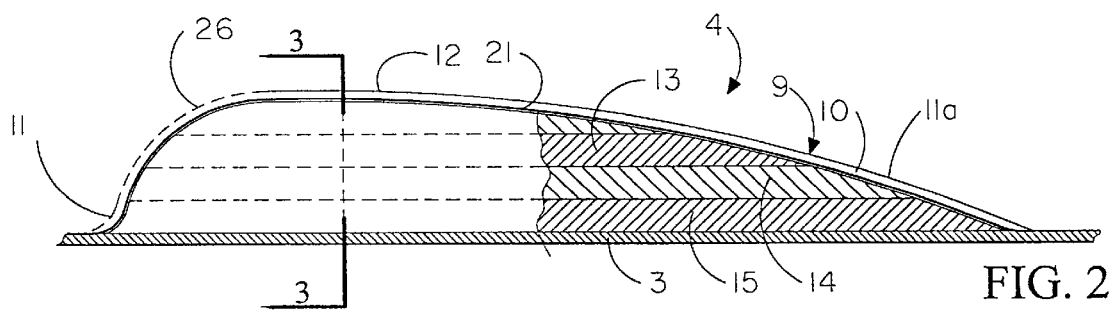
FIG. 2 is a longitudinal/vertical section enlarged and taken on the center of the element shown in FIG. 1a, with half of the element in elevation and half of the section in a section.

Referring to the drawings and particularly to FIG. 1, a device 1 shown as a flat member is illustrated moving through an air stream 2. In the illustrated embodiment of the invention, the device 1 is shown passing through the air stream 2 substantially parallel to the air stream for purposes of illustration and discussion. The device 1 includes a base structure or member 3 forming a generally continuous surface, such as an airplane, vehicle or other device moving through air or other fluid. The-exposed outer surface of the device base members 3 include a surface treatment array 4 to minimize the drag resulting from the relative movement of the air and the device. In the embodiments of FIGS. 1–3, the surface treatment 3 includes an inner layer including plurality of parallel rows 5, 6 and 7 spaced from each other along the relative direction of the air stream 2. Each row consists of a plurality of specially shaped surface elements or segments 9 which project outwardly from the face of member 3. In the illustrated embodiment, the elements 9 in each row are shown equi-spaced from each other and are similarly spaced within the respective rows. Adjacent rows have the elements 9 laterally spaced such that the elements of a first row, such as row 5, are located generally centrally of the space between elements 9 of the adjacent row 6.

Further, rather than having the rows so spaced, the elements of adjacent rows could overlap the segments of adjacent rows as shown in the lower portion of FIG. 1.

Generally, each of the elements is similarly constructed, as more fully disclosed in the enlarged illustrations of FIGS. 2 and 3.

Referring to FIG. 2, which is a longitudinal cross-sectional view taken generally in line with the air flow, the element is a somewhat elongated element 9 having an outer top wall 10 of smooth curvature from the forward or front end 11 to the rear or tail end 11a. The forward end has a generally relatively rapid smoothly rising curved surface, forming a somewhat blunt or bull-nose configuration, to the uppermost level or crest 12 of the element. From the crest, the element wall 10 curves downwardly in a more or less continuous sloping surface with lesser rate of change then the front end 11 to the outer or tail end 11a. The surface provides a smooth surface configuration from the leading or front end to the outer or tail end.

Similar vertical and parallel cross-sections show a substantially similar but smaller smooth and curved configuration to wall 10 resulting in a lateral cross-section as shown in FIG. 3. In particular, the lateral cross-section provides an essentially identical smooth curvature with a semi-circular cross-section from a first side of the element as at 13 to the second side of the element as at 13a and the connection to the base. Again, similar vertical lateral sections throughout the segment or element as shown in FIG. 3, would further illustrate the continuous curvature of the element from the front or forward end to the rear or tail end. The walls 10 of the segment also extends as a continuous member between the elements 9 of each row and between the spaced rows.

In the illustrated embodiment of FIGS. 2 and 3, the curvature is shown developed by a plurality of stacking elements 14, 15 and 16 mounted beneath an upper surface. The elements 14–16 are shown as generally rectangular elements having different lengths and widths. The upper wall 10 is a continuous member which forms a smooth continuous surface. Such a construction was used to develop test elements for evaluating the effect of the elements in an air stream. Obviously, in production, the elements could be formed as an integral single element including an appropriate upper wall and the elements 14–16 attached to the base separately or integrally. The wall 10 forms a flat or curved surface between the elements and the rows depending upon the spacing of the elements within each row as well as between the rows.

Figure 2A:
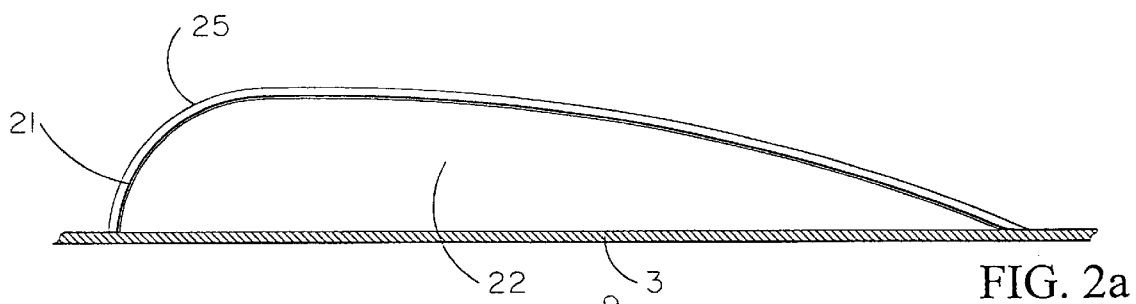
FIG. 2a is a view similar to FIG. 2 illustrating an alternate embodiment of the element of FIG. 1.

An alternative constructions is shown in FIG. 2a. The element of FIG. 2a is formed with a separate base 3 and a separate outer continuous wall 10 with the element having a separate molded form 22. Such variations as well as others will be readily provided by those skilled in the art of manufacture and assembly of elements such as shown and described.

In the preferred construction illustrated, the upper or outer surface of the member is further provided with a riblet outer wall 25, which may be integrally formed to wall 10. The riblet wall 25 includes a plurality of close-spaced ribs 26 (FIG. 5) shown as generally V-shaped cross sections extending parallel to the air stream 2. The riblet wall 25 can, of course, be integrally formed with the wall 10 or formed as a separate element attached to and overlying wall 10.

Figure 4:
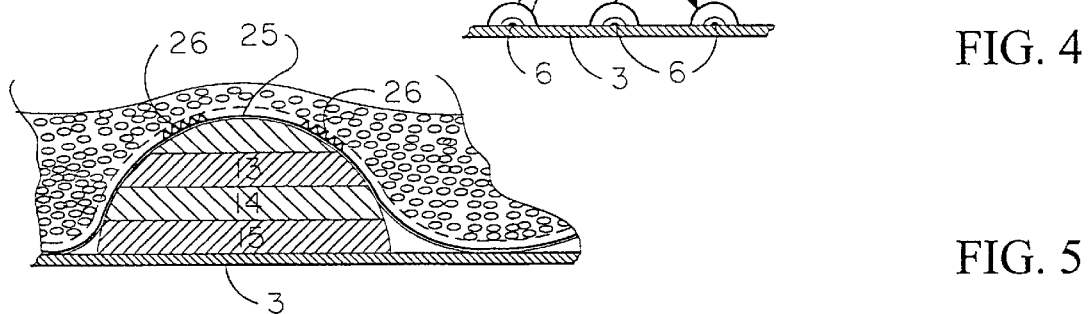
FIG. 4 is a view taken generally on line 4—4 of FIG. 1.

A single element 9 is shown in the cross-sectional views 2 and 3. In the actual construction, the vertical size and lateral size of the elements 9 can be varied to provide interacting air movement over the adjacent elements within each row and from row to row, as shown in FIG. 4. The elements 9 of row 5 are shown with a higher crest 12a and wider width 12b than the elements 9 of row 6. Further, within each row, the size of the elements and even the particular curvatures may be varied. The elements 9, particularly with the outer riblet wall and surface not only interact to provide a smooth upward flow over the surface but serve to channel the air as it moves over and between the elements 9 to provide a highly interactive air movement which promotes the release of the air from the surface to reduce the drag as a result of a surface treatment.

Figure 5:
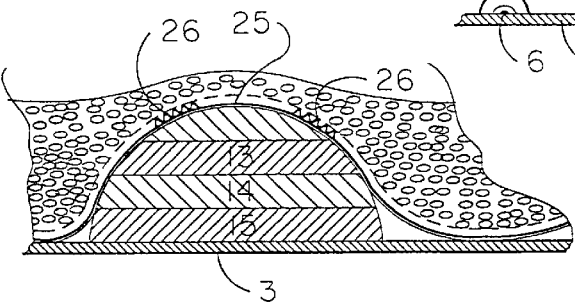
FIG. 5 is a fragmentary enlarged diagrammatic view of a portion of FIG. 1 illustrating more clearly the air stream movement relative to the surfaces of the surface elements.
Figure 6:
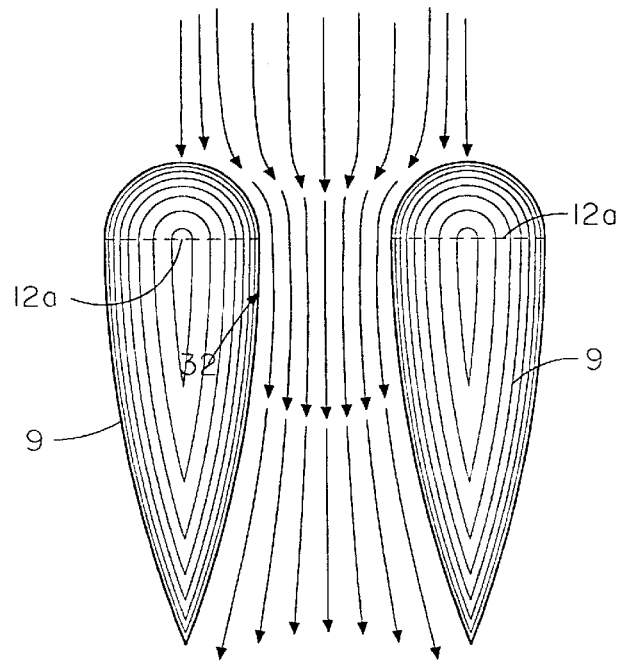
FIG. 6 is a top view adjacent elements as shown in FIG. 5.

Thus, generally, the air stream 2 as it moves over the element moves through various levels and widths. Referring to FIGS. 5 and 6, at the uppermost or highest crest 12 of each element, there is an essentially line contact 30 between the air 2 and the surface with a plurality of one or two ribs. Moving laterally and thus downwardly over each element, the total cross sectional area decreases with increasing engagement of 26 and air 31 as a result of the cross-sectional configuration of each of the elements and with the exposed riblets. Thus, at the very crest of the element, there is slight interengagement. As viewed at the central vertical portion, there is a greater overall engagement not only with the surface but the number of the riblets. At the lower levels 32, the reducing length of engagement with the riblets is of a lesser length due to the lateral cross-sectional change in the element in the longitudinal direction, a lesser direct in-line air engagement results. The air is channeled, however, as a result of the sidewall curvature and as a result of the simultaneous change in the locations of the sides at the different levels of longitudinal cross-sections resulting in more air flow at the lateral line passing from side-to-side at the crest 12. At the very lowest level, the several riblets, particularly between the element, are also in engagement with the channelled air.

In summary, there is a minimal total surface interengagement with the air at the crest but moving into the channel between the segments 9, the amount of air and surface engagement increases as a result of the shape of the segments and the riblets. Further, the shape of the elements and the ribs and the orientation thereof are at a continuously changing angle; providing multi-dimensional angular orientation with respect to the air with a continuous change in the velocity of the air and of creation interaction to minimize the drag effect. In essence, it appears that there is a lessening surface contact and drag as a result of an original zero velocity difference between the velocity of the vehicle and the air stream; that is, the relative air movement over the surface as a result of the movement of the vehicle through the air. Further, the shape of the devices tends to interact within channelling and provide interaction which further creates a process, the volume air moving outwardly from the surface in various multi-dimensions and directions. This action tends to create an organized body of air which moves along with less and less interaction or contrast between the surface air and the surface as such.

Figure 7:
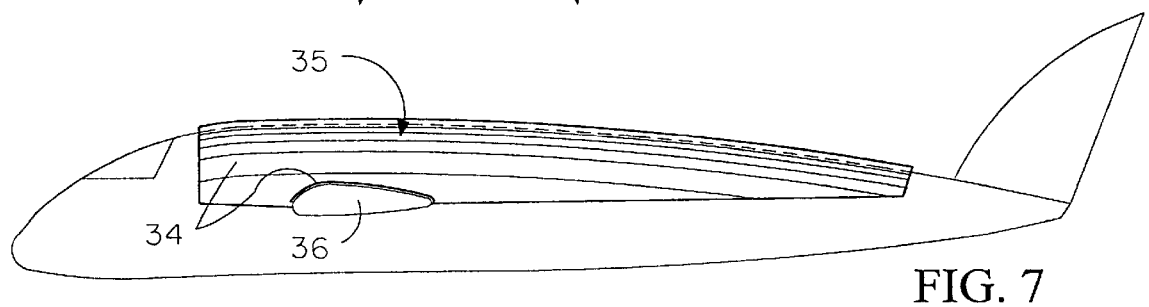
FIG. 7 is a side elevational view of an airplane with the surface treatment applied to various portions thereof.

An application is shown in FIG. 7 wherein the surface treatment 34 is applied to the upper portion 35 of an airplane including the wing structure 36 to reduce the drag effect and as a result increase the lift effect. Further, as the attitude of the plane take off rises at an angle into the air during take-off or similarly tilts in landing, the lift characteristic will assist in optimal movement of the plane.

Figure 8:
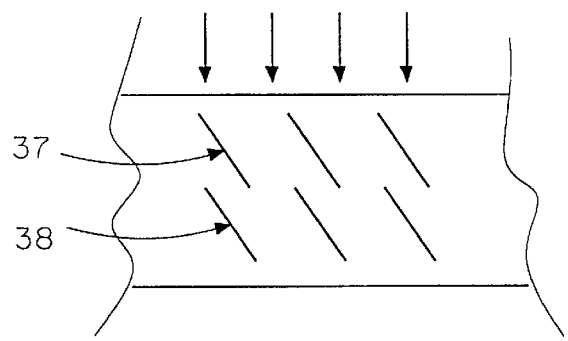
FIG. 8 is a pictorial view of an alternate construction of the illustrated embodiment with angulated elements.

Although applicant has not fully tested the characteristic with different orientations of the elements within each row or with respect to other changes in sizes and distributions, it would appear that angular orientation of the elements or segments in rows 37 and 38 in an alternate embodiment as shown in FIG. 8 may provide a more effective characteristic with respect to the reduction of the drag and the optimal lift characteristics when applied to parts of an aircraft and the like.

In the illustrated embodiment of the invention, the outermost ends or tips of the element 9 including the riblet 25 present an area of maximum air surface velocity contrast and result in the maximum drag. The system tends to pull layers of air along with the surface resulting in a diminishing velocity differential. This force increases with the level at the base portion such that the significant percentage reduction in the drag can be anticipated.

Thus, the multi-shaped elements and the orientation thereof provide the interengaging surfaces to produce interaction minimizing the drag effect.

Figure 9:
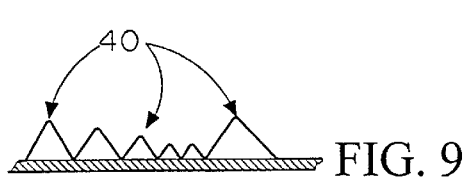
FIGS. 9, 10 and 11 illustrate alternate embodiments of ribs shown in FIGS. 1–5.

Although shown with a particular V-shaped riblet in the above embodiment, the small riblets may take various other structures and orientations. For example, the riblets 40 may have differing vertical and/or lateral dimensions as shown in FIG. 9.

Figure 10:
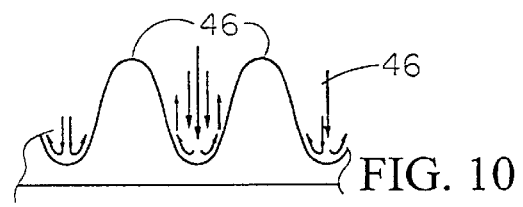

Each riblet 40 could also have a more curved configuration in the peak portion, as at 41 and at the base 42, as shown in FIG. 10.

Figure 11:
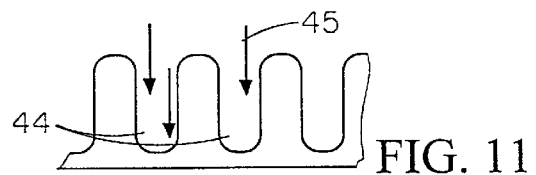

Alternatively, the riblets may be a substantially rectangular channel or riblet as in FIG. 11 forming a rectangular recess 44. Such a configuration changes the interior capacity and pressure within the riblets as well as providing a somewhat greater surface interengagement with the movement of air. The air volume and the forces created between the rectangular channel 44 of FIG. 11 and the more shallow U-channel of FIG. 10, will create different downward pressure forces from the air 45 and 46, respectively, which can be applied with respect to the surfaces. Thus, in the rectangular configuration of FIG. 11, the movement tends to direct the air into the pocket whereas in the U-shaped configuration there is a greater tendency for the air to move smoothly from one riblet 26 to the next with a decrease in the pressure condition. This indicates that the rectangular configuration of FIG. 11 could be advisably used on the bottom of an air wing or other portions of the air frame to provide a lift pressure condition. In contrast, the upper surface would advisably use a generally U-shaped riblet of FIG. 10 to minimize any downward pressure conditions, and thereby further contribute to the lift characteristic.

Although shown particularly applied to an airplane, the design can be applied to other vehicles and other surfaces such as a boat propeller, a sail of a sailboat and other applications involving a body moving therethrough.

Figure 12:
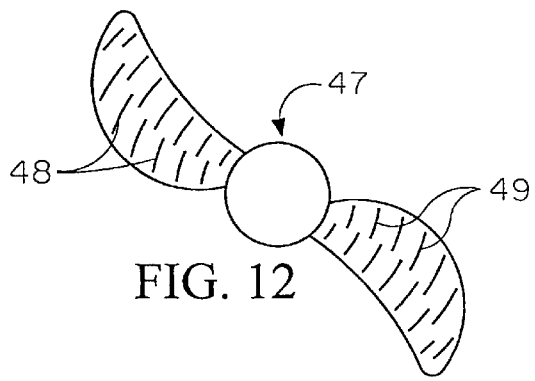
FIG. 12 is a diagrammatic view of propeller provided with surface treatment in accordance with the invention.

For example, as applied to an outboard motor propeller, the pressure face of the propeller, as shown in FIG. 12, would be provided with the generally channel-shaped riblet surface 49 while the trailing face would be provided with the more V-shaped riblet 26 surface superimposed on the control elements.

Figure 13:
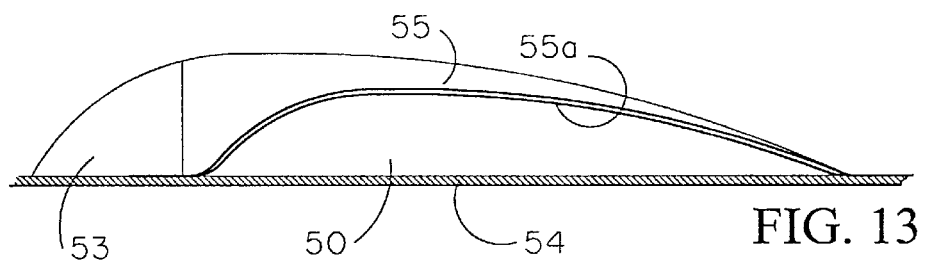
FIG. 13 is a view similar to FIG. 1 showing a further embodiment of the present invention.
Figure 14:
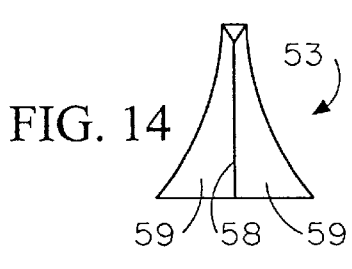
FIG. 14 is a sectional view taken generally on line 14—14 of FIG. 13.
Figure 15:
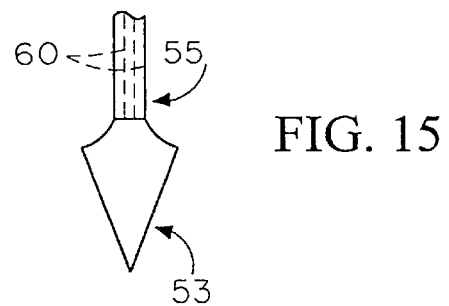
FIG. 15 is a front view of FIG. 14.
Figure 16:
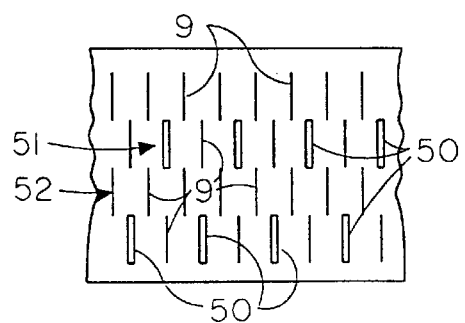
FIG. 16 is a top view of FIG. 14.

Although a preferred construction has been illustrated, the surface treatment may further include partially flexible segments 50; for example, as shown in FIGS. 13, 14 and 15. The flexible segments 50 are interposed between selected rows 51 and 52 of the segments 9 as diagrammatically shown in FIG. 16. The forward end of the special flexible segment 50, as shown in FIGS. 14 and 15, is formed as an enlarged multi-curved front portion or body 53 secured to the base or riblet member 54 while the central and trailing portion 55 is formed as a free tail portion having an undersurface 55a which is generally spaced from the base. The undersurface 55a has a slightly lateral curvature either to form a slightly rounded bottom as shown in FIG. 13 at 55a. As the flow increases, the segment would bend downwardly and/or laterally with particular direction of movement from the adjacent row. The segment and the flexible end 55 could be formed in a variety of lengths and elevations to provide different responses and interaction with the moving channelled air. Further, as shown in FIGS. 14 and 15, the front body 53 includes a central ridge 58 with the side walls having a shallow cupped shape 59 to guide the air flow over and to the sides and into the basic surface of the segments 9 and the riblets.

The flexible segments 50 are thus preferably formed with a special arrow-type head structure secured to the base with the flexible tail portion projecting outwardly therefrom. The head end generally includes the generally triangular head structure, including slightly tapered and inclined, cupped or rounded side walls rising from the base to an inclined crest. The outer tail portion 55 is integrally formed therewith and extend rearwardly therefrom as a single unit which may have a similar shape or can be formed with a plurality of individual tails, as shown by dotted lines 60. The underside of the rearwardly projecting tail portion is preferably convex and provide a largely relatively significant shield area with respect to the underlying barbed surface to further minimize resistance to flow across that surface in all directions. As previously noted, the segments are interspaced and sized in accordance with any specific application and can be readily determined through simple test response of the surface within a wind tunnel or other forced flow through relative fluid movement. The distributed barbs function to provide a controlled outer buffer surface within the air stream by providing controlled air flows from the crest downwardly throughout the elements. The segments can act to absorb energy from a variations in flow, both in intensity and direction and to release such flow as the fluid flow changes. The segments will also tend to smooth out the flow to conform more closely to the relative direct vehicle movement with respect to the air and thus the orientation with respect to the other elements of the surface modification. The flexible portions tend to produce a shielded or sheltered area therebeneath with respect to the wind or the relative movement of the fluid and further minimize drag characteristics.

Figure 17:
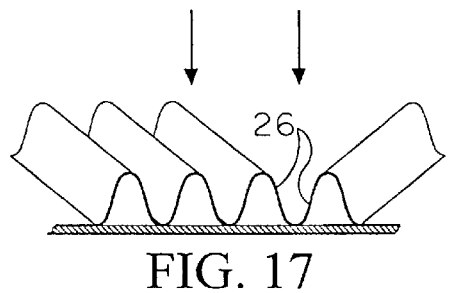
FIG. 17 is a view similar to FIG. 1 by diagrammatically illustrating the segments angularly oriented relative to the illustration of FIG. 1.

Further, the offset may be in a parallel relation or even in opposite relationship; for example, as shown in FIG. 17.

The angular orientation of each row, with respect to the travel, could provide for disposal of the air movement laterally for purposes of diversion of the air or even for conserving and capturing of the air to increase pressure and/or lift. Other angular orientations may develop various other forms of lift and pressure conditions.

Further, the riblets, as shown in the various embodiments, may be formed with varying vertical dimensions and may or may not be equally spaced with respect to the segments or elements. Further, the riblets may be formed with separate angular orientation with respect to the flow through the segments.

In summary, the combination of the elements or segments along and/or particularly in combination with the outer small rib-like surface construction will provide various forms of response and can be readily developed and provided in accordance with simple application and air tunnel testing and the like.

Although the combination of the basic segments and the outer riblets is preferred, the segments may be applied without the riblets. The particular shape of the segments, and the riblets, may be varied with respect to the size and orientation as to each and as to each other.

The illustrated embodiment discloses various applications. In addition, the surface treatment can be provided to any body or member which is moved relative to a fluid. The surface treatment would be readily incorporate in various land vehicles, water surface water vehicles, submerged water vehicles, smaller devices such as golf club heads, sailboat structures including the sails, and many other devices and bodies moving through air, water or other fluids.

Various modes of carrying out the invention are contemplated as being within the scope of the following claims particularly pointing out and distinctly claiming the subject matter which is regarded as the invention.

I claim:

1. A body moving relative to a fluid and having a surface for minimizing opposition to the relative movement therebetween, comprising:

a plurality of first tear-shaped elements extending outwardly from said surface of said body in a predetermined direction with respect to said surface and said fluid, each of said elements having an outer rigid surface and a longitudinal cross section including a forward end generally curving upwardly from a leading end at a substantial rate to a crest and then extending substantially more gradually downwardly to a trailing end and each having a transverse cross section defining a smooth continuously varying curved surface, said plurality of first elements align in rows which define an entrance which changes rapidly from a maximum to a minimal cross section at the crest and then expands laterally from the crest to the trailing end of the adjacent elements, the outer rigid surface of said elements and the surfaces of said body located between said elements being formed with a plurality of riblets including minute series of parallel and alternating peaks and valleys whereby the fluid flow relative to said body minimizes the drag with respect to the relative movement of said body.

2. The body of claim 1 wherein the elements in each row are substantially equi-spaced and the elements in adjacent rows are laterally offset to locate the elements in one row located between the elements in the adjacent row or rows.

3. The body of claim 1 wherein a second plurality of first elements having crests that are lowere than the crest of said plurality of first tear-shaped elements.

4. The body of claim 1 wherein said plurality of first tear-shaped elements alignment in said rows is angularly mounted with respect to the relative movement through the fluid and create a transverse flow of fluid over the body.

5. The body of claim 4 wherein said elements generate a multiple dimensional fluid movement over and out from the surface defined by said elements and riblets.

6. The body of claim 1 wherein said rows are spaced from each other, and flexible elements are interposed between selected rows, each of said flexible elements including a forward end of a shape substantially corresponding to the said plurality of first tear-shaped elements in each row and having a trailing portion extending from the forward end as a flexible tail member spaced upwardly of the outer surface of the body.

7. A body mounted for relative movement through a fluid and having an outer surface constructed to reduce draft on the body, comprising a plurality of air control and directing tear-shaped elements projecting outwardly of the surface and formed with a smooth and rigid curved outer surface, said elements being secured to the body in laterally spaced generally parallel relationship to each other and at an angle to the relative movement of the fluid and said elements, said elements establishing a fluid passageway between the elements which generally have a leading portion which gradually reduces to a given narrow passageway and then gradually enlarges to form an enlarged passageway at the trailing end of the elements, each of said elements includes a forward surface defining a substantially conically smooth surface rising to a crest and a generally conically tapered trailing surface extending downwardly and outwardly therefrom for a distance substantially greater than the forward surface, and a plurality of riblets including minute series of parallel and alternating peaks and valleys mounted on said tear-shaped elements.

8. The body of claim 7 wherein selected elements of said air control and directing elements are formed of different heights and lateral dimension.

9. The body of claim 7 including interspersed flexible segments including a front portion secured to the body and a trailing tail portion raised above the body, said tail portion being flexible and moving vertically and laterally in response to the relative air flow.

* * * * *